(12) United States Patent  (10) Patent No.: US 6,309,024 B1
Busch  (45) Date of Patent: Oct. 30, 2001

(54) SEAT BELT APPARATUS (75) Inventor: Craig A. Busch, Armada, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/518,476

(22) Filed: Mar. 3, 2000

(51) Int. Cl.$^7$ ..................................... A47C 31/00
(52) U.S. Cl. ..................... 297/484; 297/468; 24/170; 24/265 BC
(58) Field of Search ..................... 297/468, 484, 297/483; 24/188, 170, 585, 265 BC (56) References Cited

U.S. PATENT DOCUMENTS

| 1,898,090 | | 2/1933 | Lethern . | |
|---|---|---|---|---|
| 2,171,496 | * | 8/1939 | White et al. | 297/484 |
| 2,195,334 | | 3/1940 | Lethern . | |
| 2,255,258 | * | 9/1941 | Lethern et al. | 297/484 |
| 2,275,450 | | 3/1942 | Manson . | |
| 3,165,357 | | 1/1965 | Ruedemann, Jr. . | |
| 3,306,662 | | 2/1967 | Finnigan . | |
| 3,325,212 | | 6/1967 | Dillender . | |
| 3,639,000 | | 2/1972 | Keltner . | |
| 3,834,758 | | 9/1974 | Soule . | |
| 4,302,049 | | 11/1981 | Simpson . | |
| 4,342,483 | | 8/1982 | Takada . | |
| 4,606,552 | | 8/1986 | Hultqvist . | |
| 4,682,390 | * | 7/1987 | Parrish | 297/484 |
| 4,854,608 | | 8/1989 | Barral . | |
| 4,919,488 | | 4/1990 | Deegener et al. . | |

FOREIGN PATENT DOCUMENTS 214350   1/1957   (AU) .
3636203  5/1988   (DE) .

* cited by examiner

Primary Examiner—Anthony D. Barfield
(74) Attorney, Agent, or Firm—Tarolli, Sundheim, Covell, Tummino & Szabo L.L.P.

(57) ABSTRACT

An apparatus (10) for helping to protect a vehicle occupant (12) seated in a vehicle seat (14). The apparatus (10) includes first and second shoulder belt portions (30, 32), first and second lap belt portions (74, 85), and a buckle mechanism (49). The first and second shoulder belt portions (30, 32) are connected with the vehicle (16) and extend from an upper portion (20) of the vehicle seat (14) adjacent the shoulders of the occupant (12). A first end portion (62) of the first lap belt portion (74) is connected at a first location (64) with the vehicle (16) adjacent a first side (22) of the vehicle seat (14). A first end portion (66) of the second lap belt portion (85) is connected at a second location (68) with the vehicle (16) adjacent a second side (24) of the vehicle seat (14). Each of the first and second lap belt portions (74, 85) extends from one of the first and second sides (22, 24) of the vehicle seat (14) and partially across the lap of the occupant (12). The buckle mechanism (49) interconnects the first and second shoulder belt portions (30, 32) and the first and second lap belt portions (74, 85) adjacent a waist of the occupant (12). The buckle mechanism (49) includes first and second frame portions (48, 52) connected to the first and second shoulder belt portions (30, 32). The buckle mechanism (49) further includes first and second belt guides (124, 128) through which the first and second lap belt portions (74, 85) extend. The first and second belt guides (124, 128) are pivotally connected to the first and second frame portions (48, 52), respectively.

9 Claims, 7 Drawing Sheets

SEAT BELT APPARATUS

FIELD OF THE INVENTION

The present invention relates to a seat belt apparatus for use in protecting a vehicle occupant in a vehicle seat.

BACKGROUND OF THE INVENTION

A known seat belt apparatus includes two shoulder belts extending from an upper portion of a vehicle seat. Each of the shoulder belts has one end connected with the vehicle. Each of the shoulder belts has another end connected with a buckle mechanism.

A lap belt extends from each side of the vehicle seat and partially across the lap of the occupant. Each of the lap belts has one end anchored to the vehicle adjacent a side of the vehicle seat. Each of the lap belts has another end connected with the buckle mechanism. The buckle mechanism interconnects the shoulder belts and the lap belts with the shoulder belts and lap belts extending about the occupant of the seat.

SUMMARY OF THE INVENTION

In accordance with one feature of the present invention, an apparatus is used to help protect a vehicle occupant seated in a vehicle seat. The apparatus comprises first and second shoulder belt portions, first and second lap belt portions, and a buckle mechanism. The first and second shoulder belt portions are adapted to be connected with the vehicle and adapted to extend from an upper portion of the vehicle seat adjacent the shoulders of the occupant. A first end portion of the first lap belt portion is adapted to be connected at a first location with the vehicle adjacent a first side of the vehicle seat. A first end portion of the second lap belt portion is adapted to be connected at a second location with the vehicle adjacent a second side of the vehicle seat. Each of the first and second lap belt portions is extensible from one of the first and second sides of the vehicle seat and partially across the lap of the occupant. The buckle mechanism is for interconnecting the first and second shoulder belt portions and the first and second lap belt portions adjacent a waist of the occupant. The buckle mechanism includes first and second frame portions connected to the first and second shoulder belt portions, respectively. The buckle mechanism further includes first and second belt guides through which the first and second lap belt portions extend. The first and second belt guides are pivotally connected to the first and second frame portions, respectively.

In accordance with another feature of the present invention, an apparatus for use in helping to protect a vehicle occupant seated in a vehicle seat comprises a buckle mechanism for association with a seat belt system. The seat belt system includes first and second shoulder belt portions and first and second lap belt portions. The buckle mechanism includes first and second frame portions for connecting to the first and second shoulder belt portions, respectively. The buckle mechanism further includes first and second belt guides for receiving the first and second lap belt portions, respectively, so that the belt portions extend through the belt guides. The first and second frame portions are engageable with each other to interconnect the first and second shoulder belt portions and the first and second lap belt portions adjacent a waist of the occupant. The first and second belt guides are pivotally connected to said first and second frame portions, respectively.

BRIEF DESCRIPTION OF THE DRAWINGS

The foregoing and other features of the present invention will become apparent to one skilled in the art to which the present invention relates upon reading the following description of the invention with reference to the accompanying drawings, in which.

DESCRIPTION OF THE PREFERRED EMBODIMENT

Figure 1:
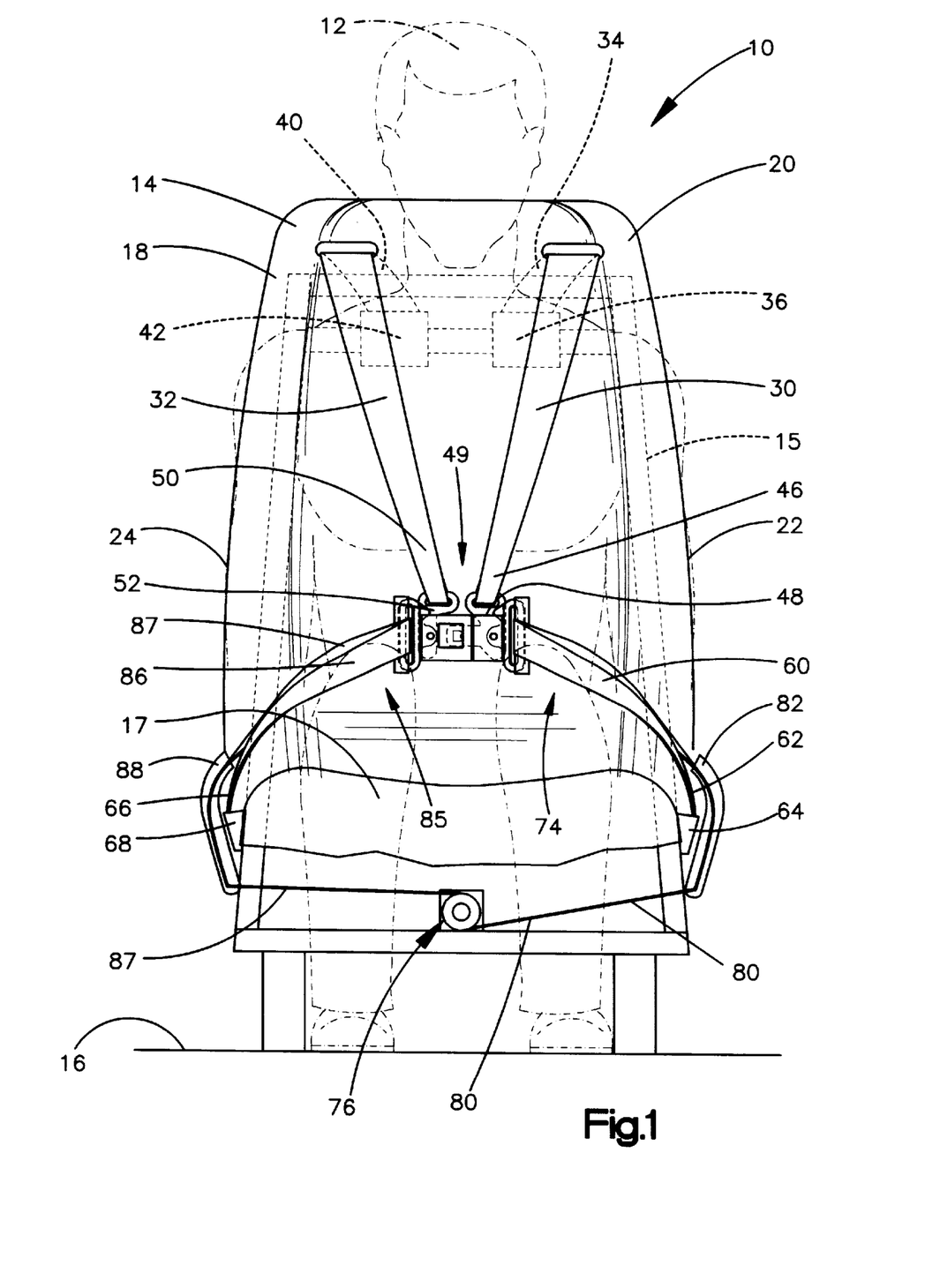
FIG. 1 is a schematic view of a vehicle seat including a seat belt apparatus of the present invention.
Figure 2:
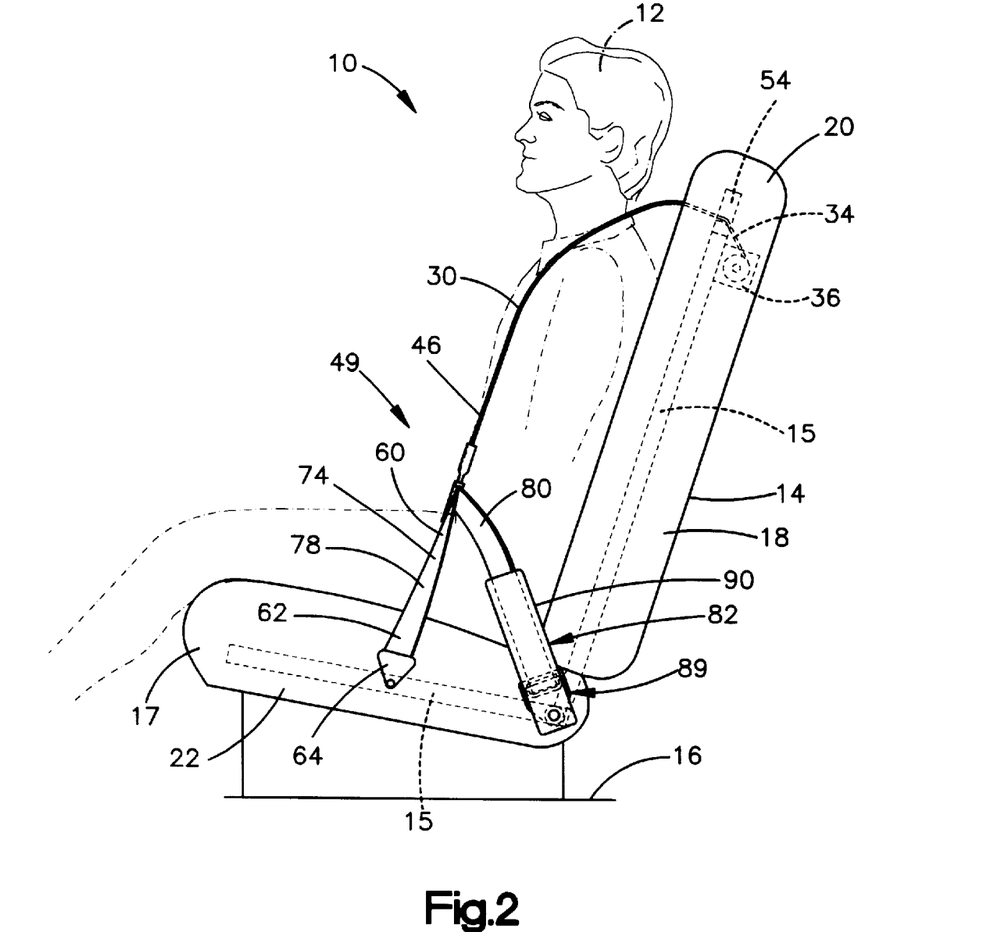
FIG. 2 is a schematic side view of the vehicle seat of FIG. 1.

A seat belt apparatus 10 for restraining a vehicle occupant 12 seated in a vehicle seat 14 is shown in FIGS. 1 and 2. The seat 14 has a frame 15 connected with a floor 16 of a vehicle, as is well known in the art. The seat 14 has a seat portion 17 on which the occupant 12 sits. A backrest 18 extends from the seat portion 17. The backrest 18 has an upper portion 20 located adjacent the shoulders of the occupant 12. The seat 14 has sides 22, 24 located adjacent sides of the occupant 12.

Shoulder belts 30, 32 (FIG. 1) extend from the upper portion 20 of the backrest 18 adjacent the shoulders of the occupant 12. The shoulder belt 30 (FIGS. 1 and 2) has an end 34 connected with a shoulder belt retractor 36. The shoulder belt 32 has an end 40 connected with a shoulder belt retractor 42. The retractors 36, 42 are mounted on the frame 15 of the backrest 18 adjacent the shoulders of the occupant 12.

The shoulder belt retractors 36, 42 include springs (not shown) for biasing the retractors 36, 42 to wind the shoulder belts 30, 32 onto the retractors 36, 42. The retractors 36, 42 include locking mechanisms (not shown) to prevent unwinding of the shoulder belts 30, 32 in the event of the vehicle experiencing deceleration above a predetermined value, as is well known in the art. The retractors 36, 42 preferably lock in response to a sensor sensing deceleration of the vehicle above the predetermined value and/or in response to unwinding acceleration of the shoulder belts 30, 32, respectively, above a predetermined value.

The shoulder belt 30 (FIGS. 1 & 3) has another end 46 connected with a frame portion 48 of a buckle mechanism 49. The shoulder belt 32 has another end 50 connected with a frame portion 52 of the buckle mechanism 49. A guide 54 (FIG. 2) guides the shoulder belt 30 from the retractor 36 to the frame portion 48. Another guide (not shown) guides the shoulder belt 32 from the retractor 42 to the frame portion 52. The guides are fixedly connected to the frame 15 of the backrest 18.

Figure 8:
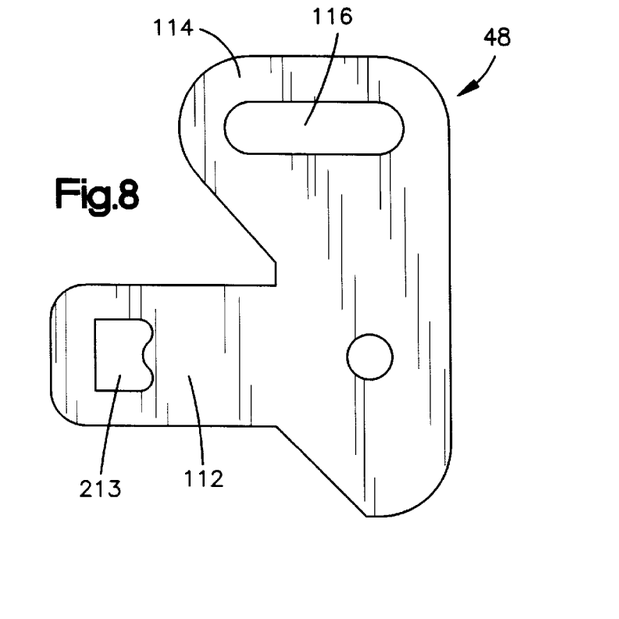
FIG. 8 is a schematic view of another part of the buckle mechanism of FIG. 3.

The frame portion 48 (FIG. 3) has a tongue 112. Preferably, the tongue 112 is formed in one piece with the frame portion 48 (FIG. 8). The tongue 112 has an opening 213 for receiving a locking member (not shown) mounted in the buckle mechanism 49 and connected with the frame portion 52 to interconnect the frame portions 48, 52, as is known in the art. The frame portions 48, 52 have housings 348, 352 for covering respective portions of the buckle mechanism 49. Also, the frame portion 52 has an associated pushbutton 53 which, when pushed, releases the locking member (not shown) to disconnect the frame portions 48, 52.

Figure 7:
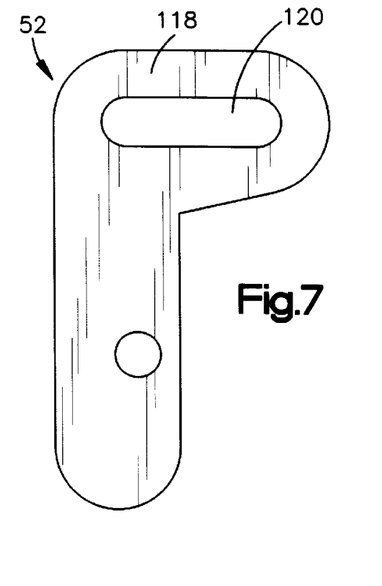
FIG. 7 is a schematic view of part of the buckle mechanism of FIG. 3.

The frame portion 48 (FIG. 8) has an upper part 114 with a slot 116. The upper part 114 extends from the housing 348. The end 46 of the shoulder belt 30 extends through the slot 116 and is sewn upon itself in a loop to connect the shoulder belt 30 with the frame portion 48. The frame portion 52 (FIG. 7) has an upper part 118 with a slot 120. The upper part 118 extends from the housing 352. The end portion 50 of the shoulder belt 32 extends through the slot 120 and is sewn upon itself in a loop to connect the shoulder belt 32 with the frame portion 52.

Figure 4:
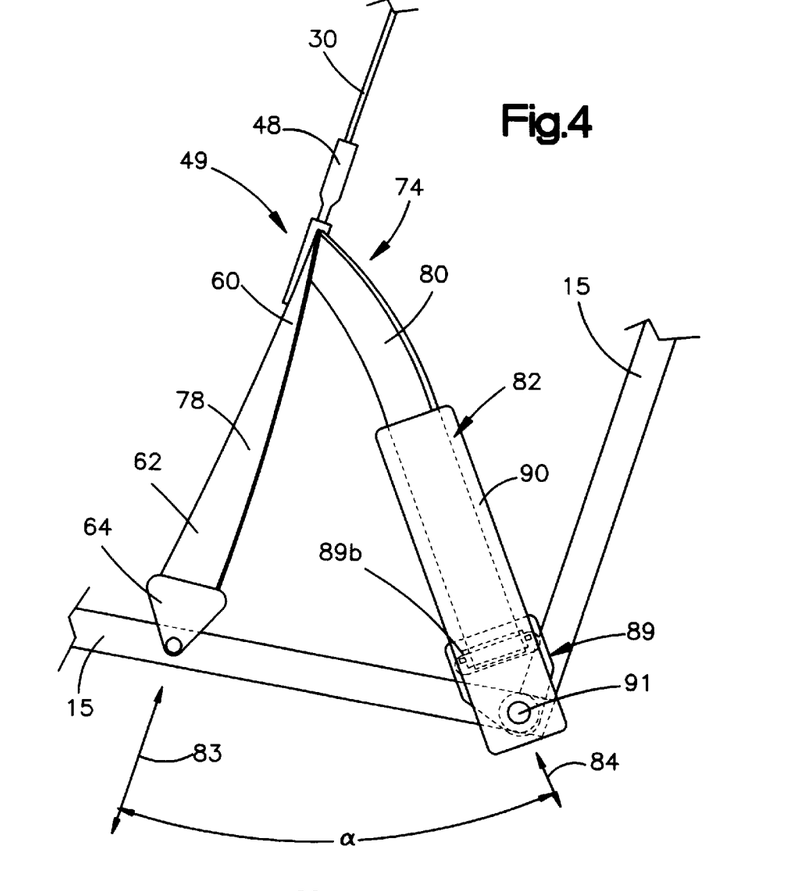
FIG. 4 is an enlarged side view of a portion of the seat belt apparatus of FIG. 1.
Figure 9:
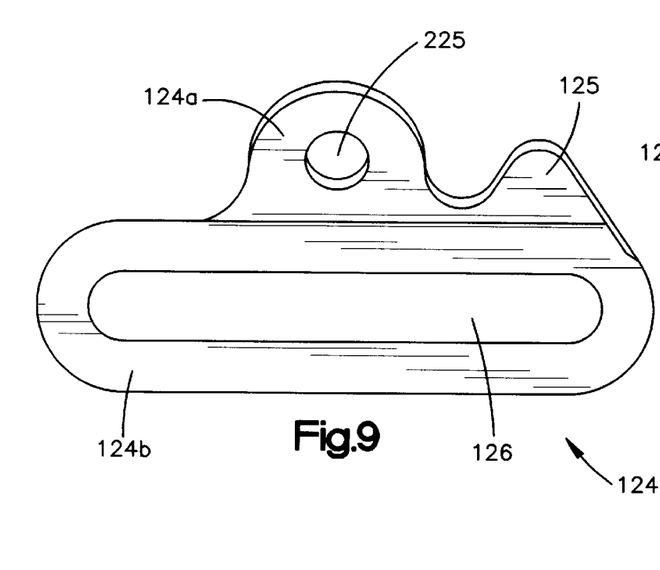
FIG. 9 is a schematic view of still another part of the buckle mechanism of FIG. 3.

A belt guide 124 (FIG. 9) is pivotally connected to the frame portion 48 to allow articulation between the frame portion 48 and the belt guide 124. The belt guide 124 has a slot 126. A lap belt portion 74 of a lap belt 60 extends from an anchor 64 through the slot 126 in the belt guide 124 and to a guide 82 (FIG. 4). The lap belt portion 74 is slidable relative to the belt guide 124 through the slot 126. The possibility of the lap belt portion 74 bunching or binding up in the slot 126 is minimized due to the articulation between the frame portion 48 and the belt guide 124.

Figures 11, 12:
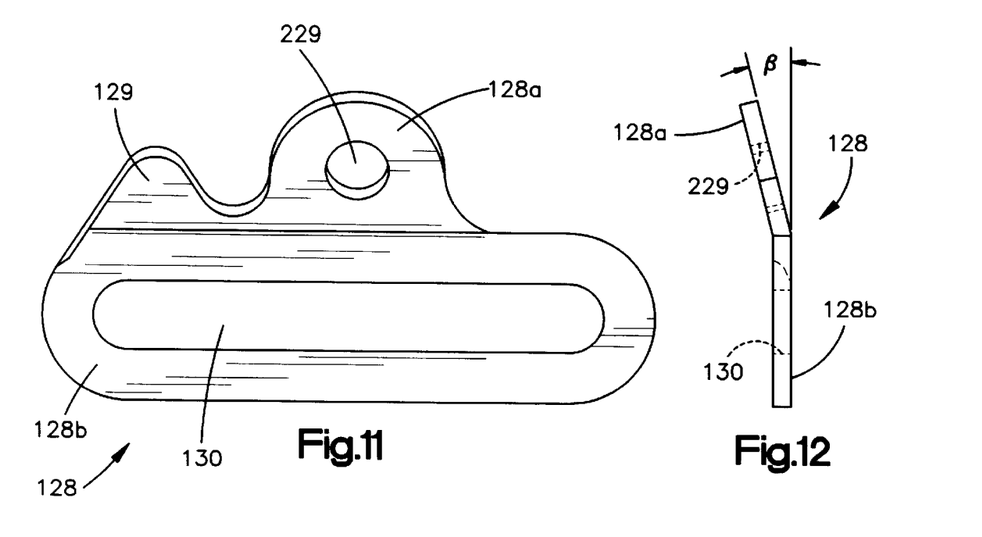
FIG. 11 is a schematic view of part of the buckle mechanism of FIG. 3.
FIG. 12 is a schematic side view of the part of FIG. 11.

A belt guide 128 (FIG. 11) is pivotally connected to the frame portion 52 to allow articulation between the frame portion 52 and the belt guide 128. The belt guide 128 has a slot 130. A lap belt portion 85 extends from an anchor 68 through the slot 130 in the belt guide 128 and to a guide 88 (FIG. 1). The lap belt portion 85 is slidable relative to the belt guide 128 through the slot 130. The possibility of the lap belt portion 85 binding up in the slot 130 is minimized due to the articulation between the frame portion 52 and the belt guide 128.

Figure 3:
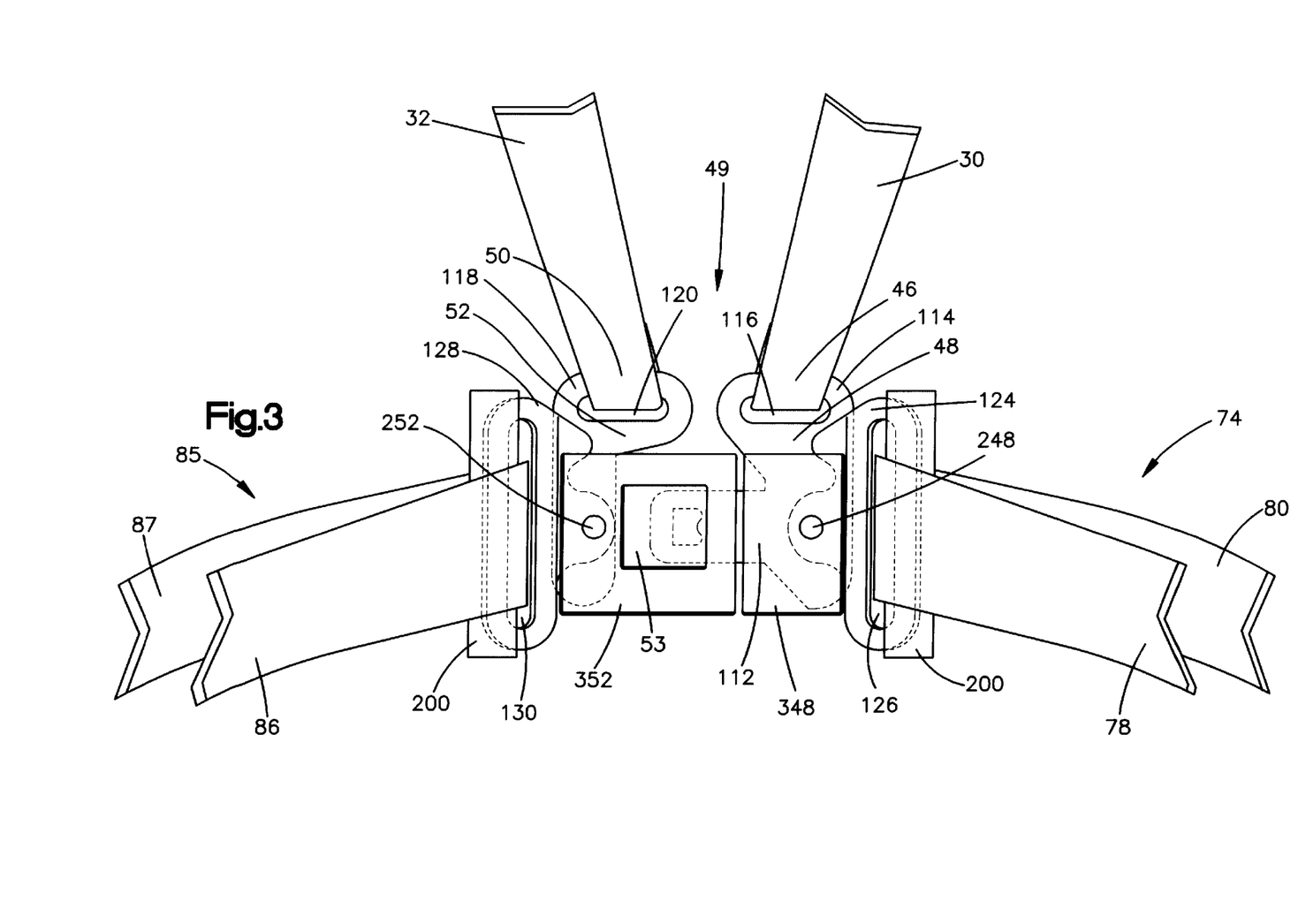
FIG. 3 is an enlarged schematic view of a buckle mechanism of the seat belt apparatus of FIG. 1.

The occupant 12 interconnects the frame portions 48, 52 of the buckle mechanism 49 by inserting the tongue 112 into an opening in the housing 352. The locking member (not shown) that is covered by the housing 352 engages the tongue 112 to hold the two frame portions 48, 52 together. The articulation of the belt guides 124, 128 relative to the frame portions 48, 52 reduces friction between the lap belt 60 and the belt guides 124, 128 and facilitates manipulation of the frame portions 48, 52. As a result, the frame portions 48, 52 are more easily drawn together from the sides 22, 24 of the seat 14 and aligned prior to inserting the tongue 112 into the housing 352.

The frame portions 48, 52 are connected to the belt guides 124, 128 by structural rivets 248, 252, which act as axles for the belt guides 124, 128 to rotate about the frame portions 48, 52, respectively. The housing 348 is connected to the frame portion 48 by the structural rivet 248. The housing 352, including the locking member (not shown) and pushbutton 53, is connected to the frame portion 52 by the structural rivet 252. The frame portions 48, 52 and belt guides 124, 128 are preferably constructed of metal.

Figure 10:
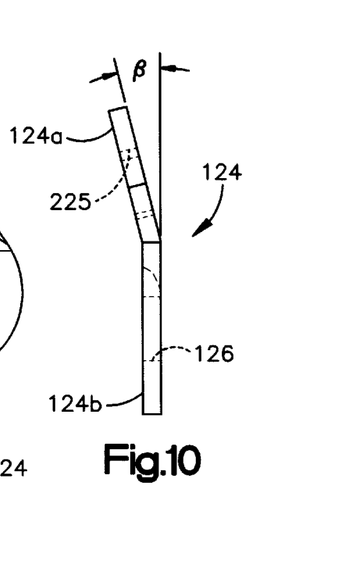
FIG. 10 is a schematic side view of the part of FIG. 9.

Each belt guide 124, 128 has a respective base portion 124a, 128a. The base portions 124a, 128a contain openings 225, 229 for receiving the structural rivets 248, 252, respectively. Each belt guide 124, 128 also has a portion 124b, 128b through which the slots 126, 130 extend. The base portions 124a, 128a lie in a plane which forms an angle β (see FIGS. 10 & 12) with a plane in which the portions 124b, 128b lie. The angle β is preferably at least 15°. The angle β facilitates the articulation of the belt guides 124, 128 about the structural rivets 248, 252 (FIGS. 9–12) when a seat occupant couples the buckle mechanism 49.

Each belt guide 124, 128 also has a rounded extension 125, 129 for limiting the pivoting of the belt guides 124, 128 about the structural rivets 248, 252. The extensions 125, 129 also inhibit objects from passing between the upper parts 114, 118 of the frame portions 48, 52 and the belt guides 48, 52 during relative rotation of the frame portions and the belt guides. Thus, the extensions 125, 129 help avoid and/or mitigate pinching of skin or clothing of the seat occupant 12 during interconnection and disconnection of the frame portions 48, 52.

Figure 13:
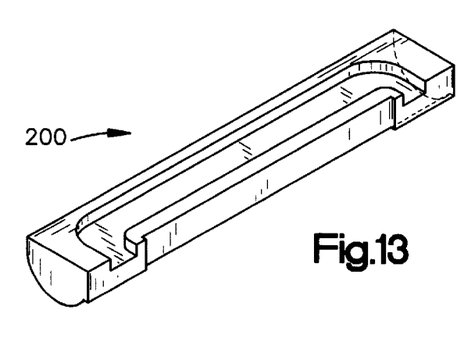
FIG. 13 is a schematic view of part of the buckle mechanism of FIG. 1.

Each belt guide 124, 128 has a molded body 200 (FIG. 13) attached to the respective belt guide for reducing sliding friction between the lap belt 60 and the belt guide. The bodies 200 are molded to the portions 124b, 128b of the belt guides 124, 128 defining the slots 126, 130 in a manner known in the art (FIG. 3). Preferably, the molded bodies 200 are constructed of a polymer such as nylon.

The lap belt 60 (FIGS. 1 & 2) has an end 62 connected to the frame 15 of the seat 14 adjacent the side 22 of the seat 14 by an anchor 64. The anchor 64 is attached in any suitable manner to the end 62 of the lap belt 60 and is preferably pivotally attached to the frame 15. Another end 66 (FIG. 1) of the lap belt 60 is connected to the frame 15 adjacent the side 24 of the seat 14 by an anchor 68. The anchor 68 is attached in any suitable manner to the end 66 of the lap belt 60 and is preferably pivotally attached to the frame 15. The anchors 64, 68 are connected to the frame 15 in any manner known in the art, such as by bolting the anchors 64, 68 to the frame 15.

The lap belt portion 74 of the lap belt 60 extends from the anchor 64 to a seat belt retractor 76 connected to the frame 15 below the seat portion 17. When the frame portions 48, 52 are interconnected, a length 78 (FIG. 4) of the lap belt portion 74 extends from the anchor 64 to the belt guide 124. Another length 80 of the lap belt portion 74 extends from the belt guide 124 through a tubular guide 82 for guiding the lap belt portion 74 to the retractor 76. The length 78 of the lap belt portion 74 extends in a first direction, indicated by the double arrow 83 in FIG. 4, and the length 80 of the lap belt portion 74 extends in a second direction, indicated by the double arrow 84 in FIG. 4. The directions 83, 84 extend at an acute angle α (FIG. 4) to each other. Preferably, the first and second directions 83, 84 extend at an acute angle of approximately 42° relative to each other.

Also, when the frame portions 48, 52 are interconnected, the lap belt portion 85 (FIGS. 1 & 3) of the lap belt 60 extends from the anchor 68 to the retractor 76. A length 86 of the lap belt portion 85 extends from the anchor 68 to the belt guide 128. Another length 87 (FIG. 1) of the lap belt portion 85 extends from the belt guide 128 through a tubular guide 88, similar to guide 82, for guiding the lap belt portion 85 to the retractor 76. The length 86 of the lap belt portion 85 extends in a first direction at an acute angle to a second direction in which the length 87 extends. Preferably, the lengths 86 and 87 of the lap belt portion 85 extend at an angle of approximately 42° relative to each other in the same manner as shown in FIG. 4 for the lengths 78, 80 of the lap belt portion 74.

Figure 5:
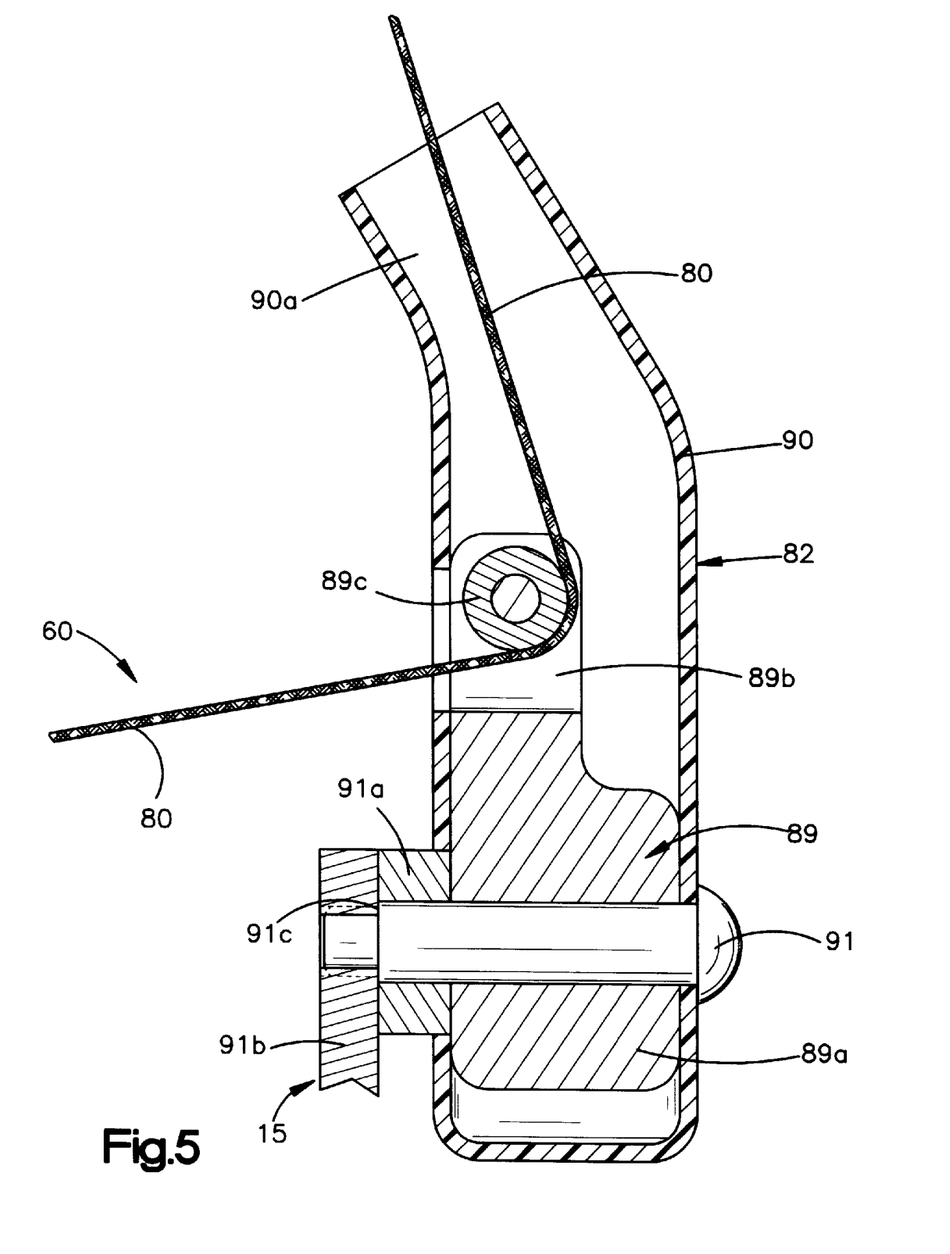
FIG. 5 is an enlarged schematic view of a portion of the seat belt apparatus of FIG. 1.

The guide 82 includes a D-ring portion 89 and a hollow cover member 90, which encloses the D-ring portion 89 (FIG. 5). The D-ring portion includes a base 89*a* having a pair of spaced apart arms 89*b*. A roller 89*c* is supported by the arms 89*b* for rotation relative to the arms 89*b* and base 89*a* about the longitudinal axis of the roller 89*c*. The hollow cover member 90 extends away from the D-ring portion 89 toward the buckle mechanism 49. The cover member 90 is contoured to curve around a part of the occupant as it extends toward the buckle mechanism 49.

The guide 82 is pivotally attached to the frame 15 of the seat 14 adjacent the side 22 by a bolt 91. The bolt 91 extends through an opening in the cover member 90 and an opening in the base 89*a* of the D-ring portion 89. The bolt 91 also extends through a spacer 91*a* and screws into a threaded opening in a fixed part 91*b* of the frame 15. The bolt 91 is a shoulder bolt and has a shoulder 91*c* which engages the part 91*b*. The D-ring portion 89 and cover member 90 are rotatable about the longitudinal axis of the bolt 91.

The length 80 of the lap belt portion 74 extends through the cover member 90 and D-ring portion 89 and around the D-ring roller 89*c*. The cover member 90 has a chamber 90*a* in which the D-ring portion 89 and roller 89*c* are located. The length 80 of the lap belt portion 74 extends from the buckle mechanism 49 into the chamber 90*a*. The length 80 of lap belt portion 74 extends through the chamber 90*a* and extends around and is guided by the roller 89*c*. The length 80 exits from the chamber 90*a* through an opening in the cover member 90. The length 80 of the lap belt portion 74 extends from the cover member 90 to the retractor 76 (FIG. 1).

The guide 88 (FIG. 1) is similar to the guide 82 and will not be described in detail. The guide 88 (FIG. 1) is pivotally connected with the frame 15 of the seat 14 adjacent the side 24. The guide 88 includes a D-ring portion similar to D-ring portion 89 of guide 82. A hollow cover member, similar to the cover member 90, is connected with the D-ring portion and extends toward the buckle mechanism 49. The cover member is contoured to curve around the occupant 12. The length 87 of the lap belt portion 85 extends through the cover member, around a roller, and to the retractor 76.

The retractor 76 has a spool 96 (FIG. 6) around which an end portion 98 of the length 80 of the lap belt portion 74 and an end portion 100 of the length 87 of the lap belt portion 85 are wound. The end portions 98, 100 of the lap belt portions 74, 85 are wound on the spool 96 in an overlapping manner.

The length 80 of the lap belt portion 74 extends from a lower side of the spool 96 (FIGS. 1 & 6) toward the guide 82. The length 87 of the lap belt portion 85 extends from an upper side of the spool 96 toward the guide 88. The end portions 98, 100 of the lengths 80, 87 of the lap belt portions 74, 85 are retained in a slot 102 in the spool 96 by a pin 104 located in a recess 106 in the spool 96. The lap belt 60 is thus connected to the spool 96 because the end portions 98, 100 are actually adjoining portions of a single, continuous length of lap belt 60 and the one-piece lap belt 60 is effectively looped around the pin 104.

Figure 6:
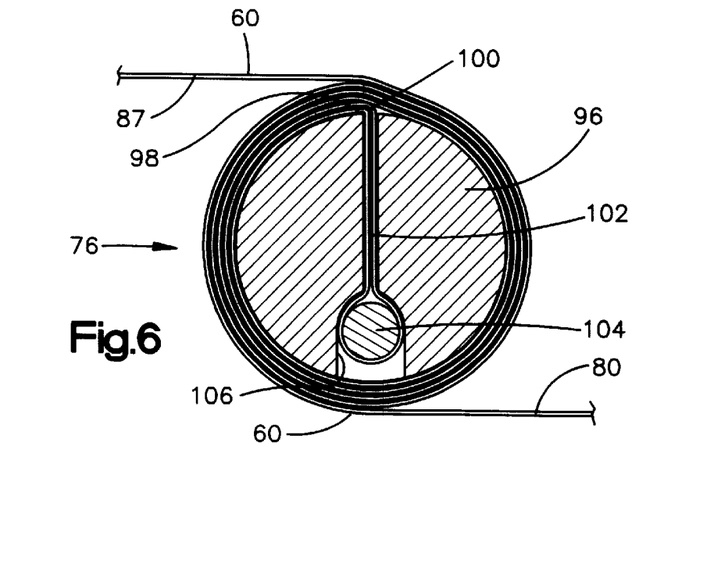
FIG. 6 is an enlarged schematic view of a spool of a retractor in the seat belt apparatus of FIG. 1.

The retractor 76 has a spring (not shown) for biasing the spool 96 to wind the lap belt 60 onto the spool 76, as is known in the art. The spring of the retractor 76 is stronger than the combined springs of the retractors 36, 42. The retractor 76 includes a locking mechanism (not shown) to prevent unwinding of the lap belt 60 in the event of the vehicle experiencing deceleration above a predetermined value, as is known in the art. The retractor 76 preferably locks in response to a sensor sensing deceleration of the vehicle above a predetermined value and/or in response to unwinding acceleration of the lap belt 60 above a predetermined value.

When the frame portions 48, 52 are disconnected, the retractors 36, 42, 76 retract the shoulder belts 30, 32 and the lap belt portions 74, 85. The retractor 76 applies equal forces to the lap belt portions 74, 85. The lap belt portion 74 slides in the guides 124, 82 and is wound on the spool 96. Likewise, the lap belt portion 85 slides in the guides 128, 88 and is wound on the spool 96. The frame portions 48, 52 are pulled by the lap belt portions 74, 85 in opposite directions toward the respective sides 22, 24 of the seat 14. The frame portions 48, 52 may be pulled into contact with the guides 82, 88, respectively.

When the occupant 12 interconnects the frame portions 48, 52, the shoulder belt portions 30, 32 and the lap belt portions 74, 85 are withdrawn from the retractors 36, 42, 76. If the occupant 12 moves the buckle mechanism 49 past a center position relative to the occupant 12 (FIG. 1), toward the side 24, an excess of the lap belt portion 85 will be unwound from spool 96. This excess will collect beneath the vehicle seat 14.

Likewise, if the occupant 12 moves buckle mechanism 49 past a center position relative to the occupant 12 toward side 22, an excess of the lap belt portion 74 will be unwound from spool 96. This excess also will collect beneath the vehicle seat 14.

When the frame portions 48, 52 are interconnected, by the occupant 12, the retractor 76 biases the lap belt portions 74 and 85, including any excess collected beneath the vehicle seat 14, to wind onto the spool 96 and centers the buckle mechanism 49 relative to the occupant 12. The retractor 76, acting on the lap belt portions 74, 85, pulls the frame portions 48, 52 rearwardly and downwardly relative to the vehicle occupant 12 to center the buckle mechanism 49 adjacent the waist of the occupant 12. The biasing spring in the retractor 76 is strong enough to overcome the combined force of the springs in the retractors 36, 42, friction in the system, and the weight of the belt portions, frame portions 48, 52, and belt guides 124, 128 to move the frame portions 48, 52.

From the above description of the invention, those skilled in the art will perceive improvements, changes and modifications. Such improvements, changes and modifications within the skill of the art are intended to be covered by the appended claims. For example, the buckle mechanism 49 comprises a means for pivotally interconnecting the shoulder belt portions 30, 32 and lap belt portions 74, 85. Alternatively, the shoulder belt portions 30, 32 could be interconnected with the lap belt portions 74, 85 by multiple buckle mechanisms pivotally connected to each other. Also, while the drawings illustrate the seat belt apparatus 10 mounted on a vehicle seat 14 and thus integrated with the seat 14, the seat belt apparatus may not be integrated with the seat 14, but mounted to the vehicle body 16. Furthermore, seat belt apparatus 10 may include pretensioners (not shown) and energy management devices (not shown).

Having described the invention, the following is claimed:

1. An apparatus for helping to protect a vehicle occupant seated in a vehicle seat, said apparatus comprising:

first and second shoulder belt portions adapted to be connected with the vehicle and adapted to extend from an upper portion of the vehicle seat adjacent the shoulders of the occupant;

first and second lap belt portions, a first end portion of said first lap belt portion adapted to be connected at a first location with the vehicle adjacent a first side of the vehicle seat, a first end portion of said second lap belt portion adapted to be connected at a second location with the vehicle adjacent a second side of the vehicle seat, each of said first and second lap belt portions being extensible from one of the first and second sides of the vehicle seat and partially across the lap of the occupant; and a buckle mechanism for interconnecting said first and second shoulder belt portions and said first and second lap belt portions adjacent a waist of the occupant, said buckle mechanism including first and second frame portions connected to said first and second shoulder belt portions, respectively, said buckle mechanism further including first and second belt guides through which said first and second lap belt portions extend, said first and second belt guides being pivotally connected to said first and second frame portions, respectively.

2. The apparatus as defined in claim 1 wherein each of said first and second belt guides has a first portion for receiving said respective first and second lap belt portions and a second portion for connecting to said respective first and second frame portions.

3. The apparatus as defined in claim 2 wherein each of said first portions of said first and second belt guides lies in a first plane that forms an acute angle with a second plane in which said corresponding section portion lies.

4. The apparatus as defined in claim 3 wherein said angle is at least 15°.

5. An apparatus for helping to protect a vehicle occupant seated in a vehicle seat, said apparatus comprising:

a buckle mechanism for association with a seat belt system including first and second shoulder belt portions and first and second lap belt portions, said buckle mechanism including first and second frame portions for connection to said first and second shoulder belt portions, respectively, said buckle mechanism further including first and second belt guides for receiving said first and second lap belt portions, respectively, so that said first and second lap belt portions extend through said first and second belt guides, said first and second frame portions being engageable with each other to interconnect said first and second shoulder belt portions and said first and second lap belt portions adjacent a waist of the occupant, said first and second belt guides being pivotally connected to said first and second frame portions, respectively.

6. The apparatus as defined in claim 5 further including rivets for connecting said first and second belt guides to said first and second frame portions.

7. The apparatus as defined in claim 5 further including extensions for limiting the pivoting of said belt guides about said frame portions.

8. The apparatus as defined in claim 5 further including first and second housings for covering a portion of said buckle mechanism.

9. An apparatus for helping to protect a vehicle occupant seated in a vehicle seat, said apparatus comprising:

a buckle mechanism associated with a seat belt system including first and second lap belt portions, said buckle mechanism interconnecting said first and second lap belt portions adjacent a waist of the occupant, said buckle mechanism including first and second frame portions and first and second belt guides through which said first and second lap belt portions extend, said first and second belt guides being pivotally connected to said first and second frame portions, respectively.

* * * * *